(12) United States Patent
Schäfer

(10) Patent No.: US 10,585,001 B2
(45) Date of Patent: Mar. 10, 2020

(54) SAMPLE HOLDER

(71) Applicant: WGSN LIMITED, London (GB)

(72) Inventor: Eric Schäfer, Stuttgart (DE)

(73) Assignee: WGSN LIMITED, London (GB)

( * ) Notice: Subject to any disclaimer, the term of this patent is extended or adjusted under 35 U.S.C. 154(b) by 0 days.

(21) Appl. No.: 15/986,894

(22) Filed: May 23, 2018

(65) Prior Publication Data

US 2018/0340823 A1  Nov. 29, 2018

(30) Foreign Application Priority Data

May 23, 2017  (GB) .................................. 1708243.9

(51) Int. Cl.
*G01N 21/01* (2006.01)
*G01J 3/02* (2006.01)
*G09F 5/04* (2006.01)
*G01J 3/50* (2006.01)

(52) U.S. Cl.
CPC ............... *G01J 3/0267* (2013.01); *G01J 3/50* (2013.01); *G09F 5/04* (2013.01); *G09F 5/042* (2013.01)

(58) Field of Classification Search
CPC ........ G01N 21/03; G01N 21/05; G01N 21/74; G01N 21/01; G02B 21/34
USPC ....................................................... 356/244
See application file for complete search history.

(56) References Cited

U.S. PATENT DOCUMENTS 2,651,421 A   9/1953  King
3,315,746 A   4/1967  Heinz

FOREIGN PATENT DOCUMENTS

| CN | 202511884 U | 10/2012 |
|---|---|---|
| CN | 103473988 A | 12/2013 |
| DE | 19621446 A1 | 12/1997 |
| GB | 552531 A | 4/1943 |
| GB | 877073 A | 9/1961 |
| KR | 1020140094310 A | 7/2014 |

OTHER PUBLICATIONS

British Search Report for GB Application No. 1708243.9, dated Nov. 22, 2017.
European Search Report for EP App. No. 18168507.4, dated Sep. 25, 2018.

*Primary Examiner* — Md M Rahman
(74) *Attorney, Agent, or Firm* — McDonnell Boehnen Hulbert & Berghoff LLP

(57) ABSTRACT

There is disclosed a sample holder comprising: a base member; a holder member attached to the base member, the holder member having at least one flexible tab resiliently biased towards the base member; wherein one of the base member and the tab comprises a first formation provided on a face thereof so that a sample having a corresponding second formation can be located between the tab and the base member and retained by cooperation of the first and second formations.

14 Claims, 4 Drawing Sheets

SAMPLE HOLDER

CROSS REFERENCE TO RELATED APPLICATIONS

The present application claims priority to British Patent Application No. 1708243.9 filed May 23, 2017, which is herewith incorporated by reference into the present application.

BACKGROUND

It is known to provide samples of decorative materials, such as paints or fabrics, to consumers. For example, such samples may be provided in a purpose-built display, which may have a plurality of stores for multiple samples of a particular paint colour or fabric.

It is also known to provide a portable book of samples which may be printed or mounted onto leaves of the book. However, such books do not permit easy removal and replacement of a sample, which may be desirable for colour matching or other purposes.

SUMMARY

According to a first aspect of the invention, there is provided a sample holder comprising: a base member; a holder member attached to the base member, the holder member having at least one flexible tab resiliently biased towards the base member; wherein one of the base member and the tab comprises a first formation provided on a face thereof so that a sample having a corresponding second formation can be located between the tab and the base member and retained by cooperation of the first and second formations.

The tab may be configured to flex to an insertion configuration to receive the sample.

The holder tab may be configured to flex away from the base member to define a jaw opening therebetween for receiving a substantially planar portion of the sample. The first formation may be configured to: extend into an opening in the planar portion of the sample, the opening being the second formation; or receive a projection extending from the planar portion, the projection being the second formation of the sample. Engagement of the first formation and the second formation may inhibit withdrawal of the sample along a withdrawal direction within the plane of the planar portion.

The first formation provided on one of the base member and the tab may oppose and may be configured to engage a third formation provided on the other of the base member and the tab in at least an empty configuration of the tab.

The empty configuration may correspond to the absence of a sample from between the tab and the base member. The tab may be in a closed position in the empty configuration, in which it engages the base member under the resilient bias.

The sample holder may be configured so that the first formation and the third formation oppose and engage with each other through the second formation of the sample when located between the tab and the base member.

The first and third formations may be configured so that the engagement of the first and third formations does not resist disengagement. For example, the first formation may be a projection which is received in the third formation, which may be an opposing recess or dimple. There may be no snap fit, or interference fit between the first and third formations. In other words, the first and third formations may be configured so that, when engaged, the force required to disengage is substantially equal to the resilient biasing force on the tab.

The first formation may be a projection and the third formation may be a hole configured to receive a portion of the first formation. The first formation may be at least partially received in the third formation in at least the empty configuration of the tab.

The first formation may be a projection on the side of the tab facing the base member.

The first formation may be integrally formed with the tab. For example, the first formation may be a projection made by punching or forming the holder member.

The projection may have a rounded or tapered profile configured so that, upon insertion of a sample under the tab, the projection rides over an end of the sample to cause the tab to flex away from the base member from an empty configuration to an insertion configuration.

The first formation may be configured to act between the tab and the base member so that the tab projects from and is inclined with respect to an adjacent portion of the holder member adjacent the tab in an empty configuration of the tab. In other words, the tab may project from an adjacent portion of the holder member when no sample is located between the tab and the base member.

The adjacent portion of the holder member may be substantially planar, and the tab may project from the adjacent portion of the holder member so that it is inclined with respect to the plane of the holder member. The holder member may be substantially planar.

Alternatively, the sample holder may be configured so that the tab is substantially flush with an adjacent portion of the holder member adjacent the tab in an empty configuration of the tab. For example, the first formation may be a projection and there may be a third formation opposing the first formation and configured to receive the first formation (i.e. under the resilient biasing force on the tab), so that the tab lies flush with the adjacent portion of the holder member.

The tab may be resiliently biased towards the base member so that when a sample is located between the tab and the base member so that it overlays an adjacent portion of the holder member adjacent the tab, the sample is clamped between the tab and the adjacent portion to inhibit withdrawal of the sample.

The tab may be hinged with respect to an adjacent portion of the holder member. The hinge may be a living hinge.

The holder member may comprise a plastics material.

There may be a plurality of flexible tabs resiliently biased towards the base member. For each tab of the plurality, the holder member and base member may have any of the features recited above with respect to each of the flexible tabs. The holder member may comprise each of the flexible tabs of the plurality.

According to a second aspect of the invention there is provided a sample book comprising a plurality of leaves, each leaf comprising a sample holder in accordance with the first aspect.

According to a third aspect of the invention there is provided a sample kit comprising: a sample holder or sample book in accordance with the first or second aspects of the invention; and a sample to be retained by a tab of the sample holder, the sample comprising a second formation configured to cooperate with the first formation of the tab or a corresponding portion of the base member to retain the sample therebetween.

The first formation may comprise a projection and the second formation may comprise a through hole configured to receive the first formation. The first formation and the second formation may cooperate to inhibit withdrawal of the sample from between the tab and the base member. There may be a clearance fit between the first formation and the second formation.

The first formation and the sample may be configured so that the first formation can extend from one side of the sample to project from the other side, through the second formation. In other words, the projection may have an axial extend along its elongate axis which is greater than the thickness of the sample in the portion of the second formation.

The sample holder and the sample may be configured to retain the sample in a retained configuration in which: the flexible tab is resilient biased against the sample so that the sample is clamped between the sample and an adjacent portion of the holder member adjacent the tab; and the first formation and the second formation cooperate to inhibit withdrawal of the sample from between the tab and the base member.

The sample may comprise a support member and a fabric swatch mounted on the support member. The first formation may be a projection on the side of the tab facing the base member, the projection may have a rounded or tapered profile configured so that, upon insertion of a sample under the tab, the projection rides over an end of the support member to cause the tab to flex away from the base member from an empty configuration to an insertion configuration. In the insertion configuration, an opening may be defined for receiving the sample, and the combined thickness of the support member and the fabric swatch may be less than a corresponding dimension of the opening to prevent sliding engagement between the end of the tab and the fabric swatch upon insertion of the sample.

The invention may comprise any combination of features recited herein, except such combinations as are mutually exclusive.

BRIEF DESCRIPTION OF THE FIGURES

The invention will now be described, by way of example, with reference to the accompanying drawings, in which.

DETAILED DESCRIPTION

Figure 1:
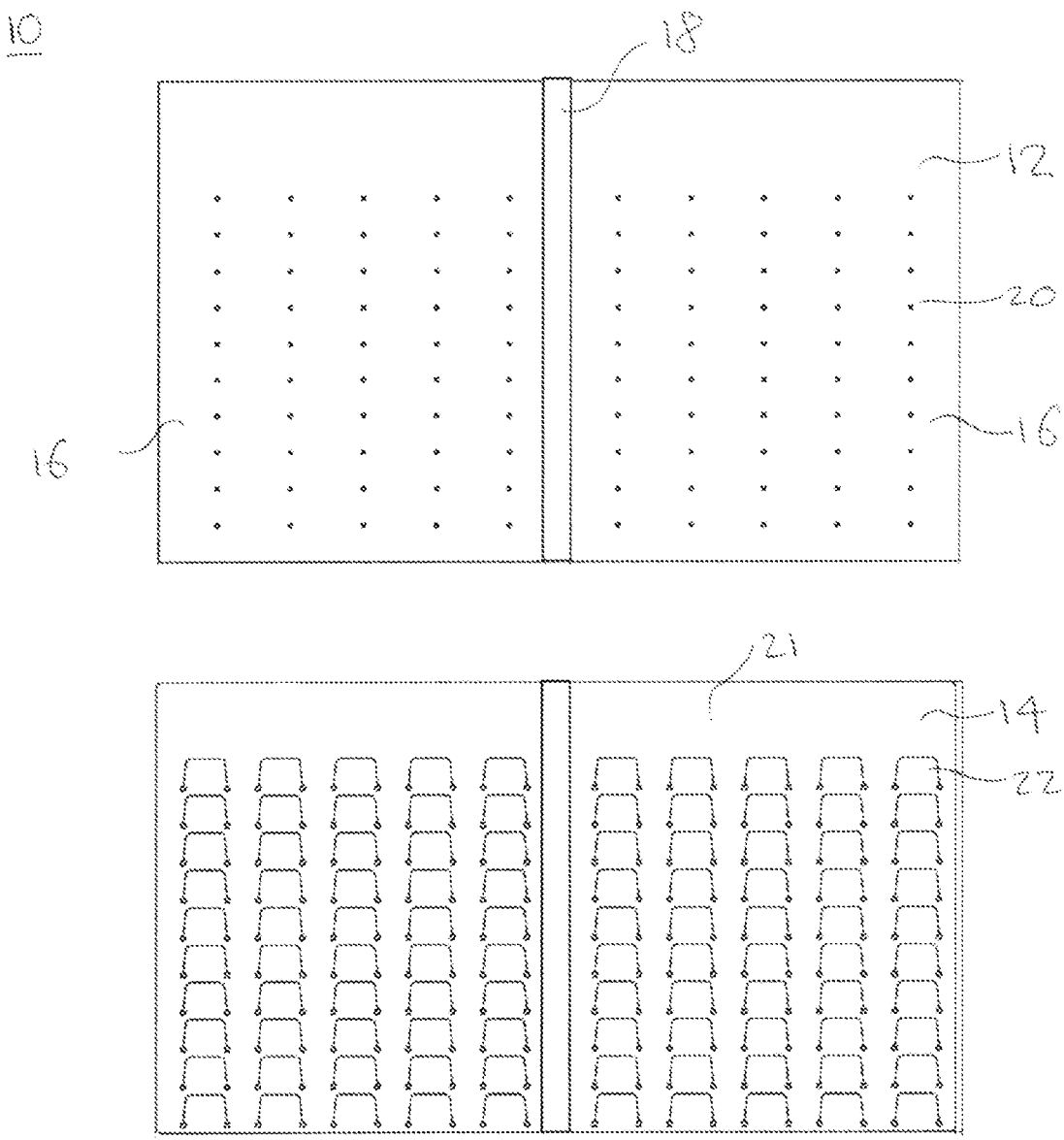
FIG. 1 schematically shows a base member and holder member of a sample holder.

FIG. 1 shows a disassembled sample holder 10 comprising a base member 12 and a holder member 14. In this example, the sample holder 10 is in the form of a sample book comprising a plurality of leaves. Two leaves 16 of the base member 12 are shown in FIG. 1, connected by a hinge 18. In this example, the holder member has corresponding leaves and a hinge, but in other examples there may be separate holder members for each leaf, or multiple holder members per leaf.

FIG. 1 shows the sample holder 10 in a disassembled state. In use, the holder member 14 is attached to the base member 12, for example by an adhesive, such as a double-sided adhesive sheet with cut-outs in portions corresponding to tabs of the holder member, as will be described below.

In this example, the base member 12 comprises cardboard. As shown in FIG. 1, there is a regular grid of holes 20 in the base member 12. The holes 20 may be blind holes or through-holes. The holes are configured to cooperate with corresponding projections located on tabs of the holder member 14, as will be described in detail below.

The holder member 14 comprises a holder body 21 and a regular grid of tabs 22 corresponding to the regular grid of holes 20 of the base member 12. In this example, the holder member 14 comprises a plastics material, such as polyethylene.

In this example, the holder member 14 is provided as a planar sheet of plastic which is punched to form the tabs 22, and formed (for example, by thermoforming under pressure) to form tab projections as will be described below with respect to FIGS. 2-8.

In this example each tab 22 is integrally formed with the surrounding holder body 21 at a living hinge therebetween, such that each tab is flexible at the hinge to pivotably deflect relative the holder body 21. The holder member is configured so that each tab 22 is resiliently biased towards the base member 12.

Figure 2:
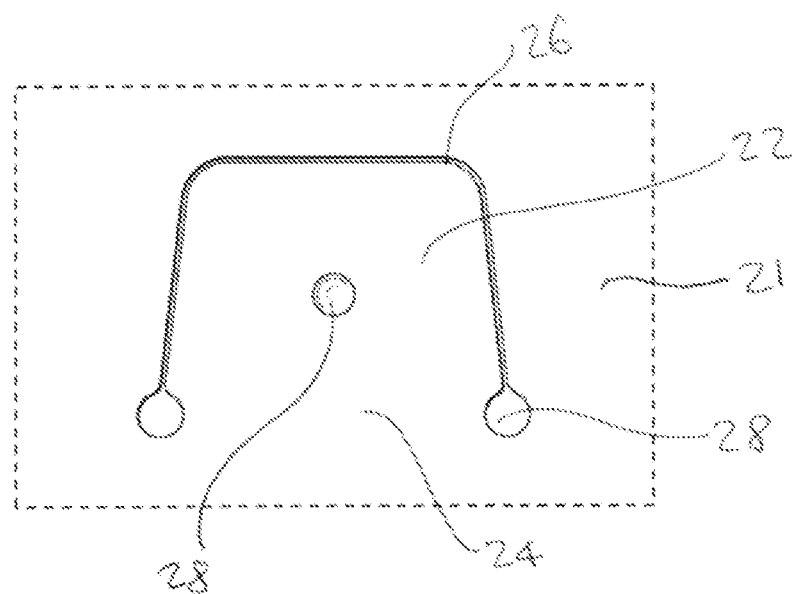
FIG. 2 schematically shows a tab.

As shown in FIG. 2, each tab 22 is delineated from the surrounding holder body 21 by the living hinge 24 and a substantially U-shaped slot 26. In this example, the slot 26 is slightly tapered with rounded edges, but it will be appreciated that the tab could be of any suitable shape.

In this example the slot terminates at either lateral side of the hinge 24 in a substantially circular cut-out 27. The cut-out 27 may serve to provide an increased lateral separation between the hinge 24 and the laterally-adjacent portion of the holder body 21, such that a sample can be inserted to underly the tab at or adjacent the hinge 24, and overlay the laterally-adjacent portion of the holder body 21 with minimal flexing of the sample card and/or the tab 22, as will be described in detail below. The cut-out 27 may also reduce stress concentrations in the holder member where the tab 22 is configured to deflect from adjacent portions of the holder body 21. The term lateral is used herein to denote a direction parallel with the hinge, and orthogonal to an insertion direction in which the sample is inserted into the tab.

Towards a central portion of the tab 22 there is disposed a projection 28 extending from the side of the tab 22 facing the base member 12 (the underside) towards the base member 28. In this example, the projection 28 is integrally formed with the tab 22 by a forming or pressing process, such that the side of the tab away from the base member 12 (the upper side) has a corresponding recess. In other examples, the upper side may have no such recess. For example, the tab 22 could be formed to include the projection 28 with no corresponding recess by injection moulding.

Figure 3:
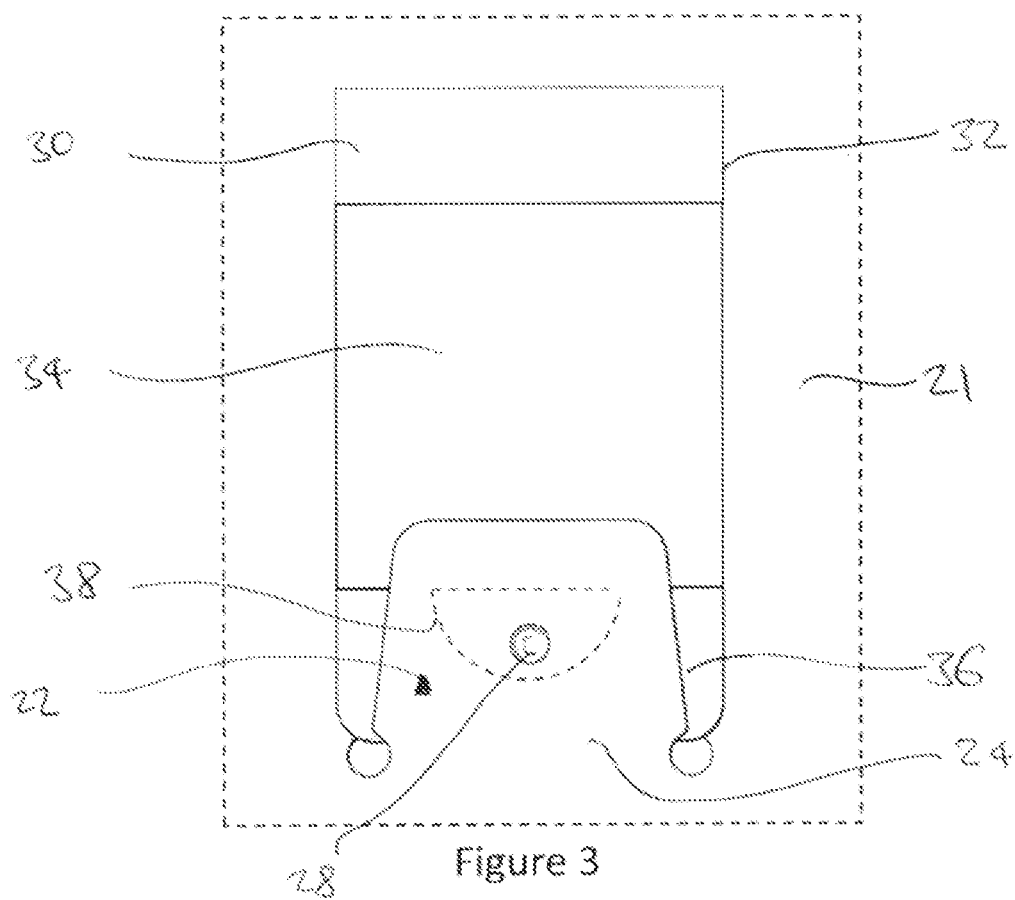
FIG. 3 schematically shows the tab of FIG. 2 retaining a sample.

FIG. 3 shows the tab 22 of FIG. 2 and a sample 30 located in the tab (i.e. partly between the tab 22 and a corresponding portion of the base member 12).

The sample 30 comprises a support member 32, which in in this example is substantially rectangular and has rounded corners at its lower end (i.e. the end to be received in the tab 22). In this example the support member 32 comprises cardboard. A swatch 34 is provided on an upper side of the support member. A swatch may be provided on the support member 32 in any suitable way, for example by printing or coating, or by an adhesive. In this example, the swatch 34 comprises a piece of fabric adhered to the support member 32. The swatch may be adhered over a limited region (for example at one edge only), for example towards a distal edge (i.e. an edge of the swatch furthest from the lower end which is to be received in the tab 22), so that a consumer may lift the fabric from the support member 32 to feel it between their fingers.

The swatch occupies a central portion of the support member 32. A distal portion of the support member (i.e. the end portion farthest from the lower end which is to be received in the tab) may include information relating to the sample.

A proximal portion 36 of the support member (i.e. the end portion closest to the lower end which is to be received in the tab) comprises a cut-out 38 configured to co-operate with the projection 28 of the tab 22. The cut-out 38 is shown in broken lines in FIG. 3 as it is obscured by the tab 22. In this example, the cut-out 38 is semi-circular with the straight edge of the semi-circle in a distal location adjacent the swatch 34.

As shown in FIG. 3, the sample 30 is located in the tab 22 (i.e. between the tab 22 and a corresponding portion of the base member 12) so that its lower end underlies the tab 22 at or adjacent the hinge 24, and so that the projection 28 of the tab is received in the cut-out 38.

As will be described in detail below, the projection 28 and the cut-out 38 co-operate to inhibit withdrawal of the sample 30 from the tab 22 (in other words, to retain the sample). The projection 28 and cut-out 38 are first and second formations respectively of a co-operating pair of projections that engage with each other to inhibit withdrawal of the sample 30 from the tab 22 (i.e. retain the sample).

In other examples, such first and second cooperating formations may be provided in different forms. For example, the first formation could be provided on the base member rather than the tab to cooperate with a second formation of the sample. Further, the first formation (i.e. on the tab or base member) could be an opening or recess, and the second formation could be a projection on the sample, projecting towards the tab or the base member respectively.

Figure 4:
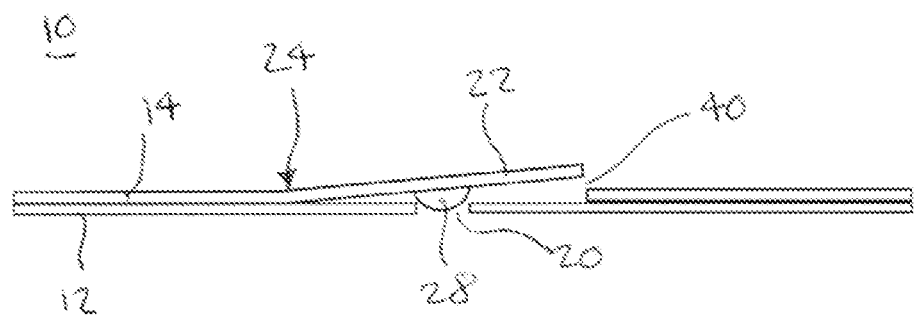
FIGS. 4, 5, 6, and 7 schematically show a cross-sectional view of a sample holder and a sample located below a tab of the sample holder.
Figure 5:
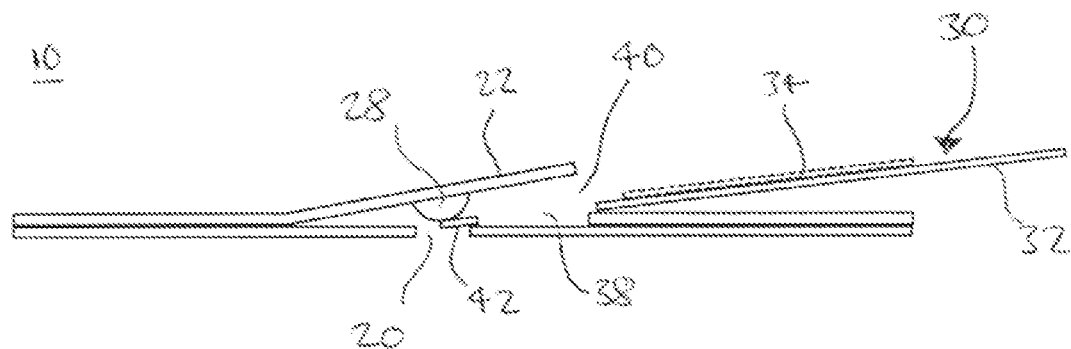
Figure 6:
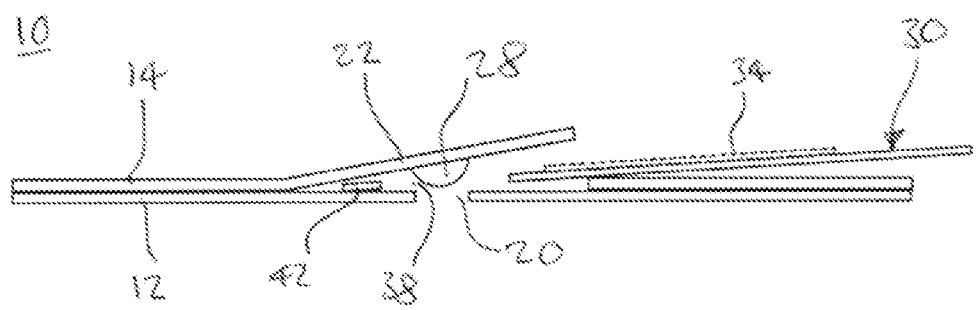

FIGS. 4-6 schematically show a sequence of partial cross-sections of the sample holder 10 and sample 30, as the sample 30 is received in the sample holder 10.

FIG. 4 shows the sample holder 10 in a closed configuration in which the resilient biasing force on the tab 22 urges it into engagement with the base member 12, so that the projection 28 on the underside of the tab is partially received in the cooperating hole 20. The projection 28 and the hole 20 form a cooperating pair of formations which may be referred to herein as a first formation and a third formation respectively. In this specific example, the first formation is provided on the tab 22 and is in the form of a projection, whereas the third formation is provided on the base member and is in the form of a cooperating hole or recess. However, it will be appreciated that in other examples the formation on the tab may be a recess or hole and the formation on the base member may be a projection. Any kinds of interlocking or mutually engaging formations may be used.

In this particular example, the projection 28 and the hole 20 (the first and third formations respectively) do not form a snap-fit or interference fit. They may be considered to engage by a loose fit, such that the force required to separate them is substantially equal to the force required to lift tab 22 against the resilient bias acting on the tab. In other examples, the first and third formations may be configured to have a snap-fit or interference fit, such that the tab 22 is fastened to the base member 12 by virtue of the first and third formations in the closed configuration.

As shown in FIG. 4, in this example the base member 12 and the holder member 14 are configured so that the tab 22 projects from and is inclined with respect to the plane of the holder body 21 in the closed configuration, such that there is a distal opening 40 between the distal end of the tab 22 (i.e. the end farthest from the hinge 24) and the adjacent portion of the holder body 21 for receiving a portion of a sample 30.

In other examples, there may be no cooperating third formation (i.e. no hole or projection to cooperate with that on the tab), and the first formation may engage directly with the opposite one of the tab and the base member from which it is provided on.

FIG. 5 shows the holder 10 of FIG. 4 in an insertion configuration in which a sample 30 is partially received in the tab 22 (i.e. between the tab 22 and the base member 12). As shown, in the insertion configuration, a proximal end 42 of the support member 32 of the sample 30 has passed through the distal opening 40 and is in abutment with the projection 28.

As the sample 30 is pushed into the tab 22, the proximal end 42 engages with the projection 28, and slides between the base member 12 and the projection 28. In this example, the projection 28 is configured to ride over the sample 30 as the sample 30 is pushed against it. In this example, the projection is rounded (it is substantially hemi-spherical), but in other examples it may be tapered to have the same effect. As the projection 28 rides over the proximal end 42 of the sample 30, the tab 22 is lifted into the insertion configuration as shown in FIG. 5, such that the opening 40 is widened (i.e. so that the tab 22 is at an increased incline with respect to the plane of the holder body 21 as compared with the closed configuration).

Widening of the opening 40 may permit easier insertion of the sample 30. In particular, when the sample 30 comprises a fabric swatch 34, widening of the opening 40 may prevent undesirable sliding engagement between the tab 22 and the fabric swatch 34 which may cause it to become dislodged, displaced or creased.

FIG. 6 shows the sample holder 10 and sample in a retained configuration in which the projection 28 of the tab 22 is received in the cut-out 38 to inhibit withdrawal of the sample 30 from the tab 22 (i.e. from between the tab 22 and the base member 12).

In the retained configuration of FIG. 6, the proximal end 42 of the sample 30 is pushed into engagement with the tab 22 at or adjacent the hinge 24. The proximal end 42 of the sample is clamped between the tab 22 and the base member 12 and/or a laterally-adjacent portion of the holder body 21 (i.e. laterally adjacent the hinge) so that the tab 22 is lifted away from the base member 12 as compared with the closed configuration. The clamping of the sample 30 inhibits withdrawal of the sample 30 from the tab 22. Depending on the stiffness of the sample 30 and the stiffness of the tab 22, the sample may flex so that at least a portion of the sample 30 is clamped between the tab 22 and the base member 12 (for example, a central portion between the hinges). In some examples, at least a portion of the sample 30 is spaced apart from the base member towards the sides of the hinge 24 so that the sample 30 is permitted to extend between the tab 22 and the laterally-adjacent portion of the holder body 21.

In the particular retained configuration of FIG. 6, the tab 22 is lifted such that the projection 28 does not engage the hole 20 of the base member (in other words, it is not even partially received in the hole 20). In other examples, the first and third formations may engage in the retained configuration.

Despite the first and third formations (i.e. the projection 28 of the tab and the hole 20 of the base member 20) not engaging in the retained configuration of FIG. 6, the first and second formations (i.e. the projection 28 of the tab and the cut-out 38 of the sample 30, in this example) engage to inhibit withdrawal of the sample 30 from the tab 22 (i.e. to retain the sample).

Figure 7:
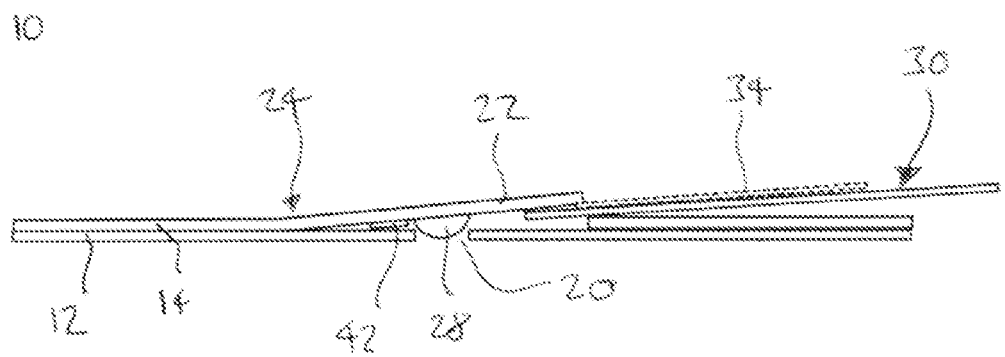

In particular, as shown in FIG. 7, when the sample 30 is partially withdrawn from the retained configuration of FIG. 6 so that the proximal end 42 of the support member 32 moves away from the hinge 24, the proximal wall of the cut-out 38 (the semi-circular wall in this example) engages the projection 28 to inhibit withdrawal.

Yet further, movement of the proximal end 42 of the support member away from the hinge 24 permits the tab 22 clamping the proximal end 42 of the support member 42 to move towards the base member 12 under the resilient biasing force acting on the tab 22. Accordingly, in at least some examples the first formation and the third formation (i.e. the projection 28 of the tab 22 and the hole 20 of the base member 12 in the example of FIG. 7) may re-engage as the sample 30 moves distally to inhibit withdrawal of the sample.

In other examples, there may be no such engagement between the first formation and the third formation, or no such engagement between the first formation and the opposite one of the tab and base member from that on which the first formation is provided. Nevertheless, in such examples the holder member and the sample may be configured so that the first and second formations engage to inhibit withdrawal of the sample 30.

In the example of FIGS. 4-7, upon application of sufficient force to withdraw the sample 30 from the tab 22, the proximal boundary of the cut-out 38 engages the rounded projection 28 so that the projection rides over the proximal portion 42 of the support member 32, which in turn causes the tab 22 to be deflected outwardly so that the sample 30 can be withdrawn.

In other examples, the projection may not be rounded or tapered to permit such withdrawal solely by pulling of the sample. In such examples, the tab can be manually lifted and the sample withdrawn.

Figure 8:
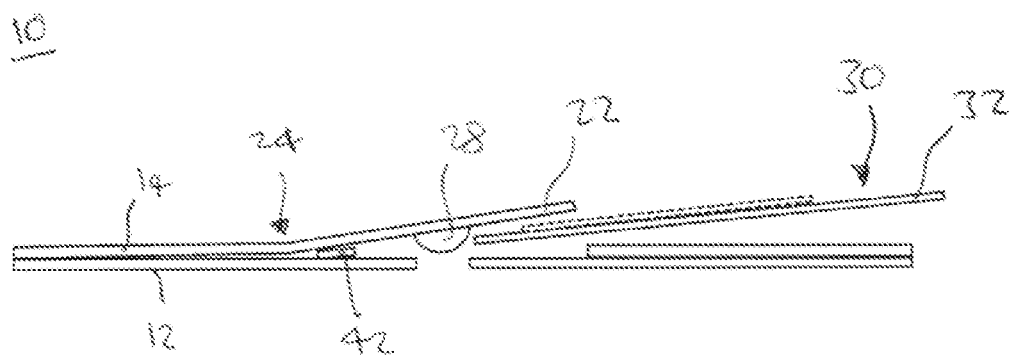
FIG. 8 schematically shows a further configuration of an example sample holder and sample.

FIG. 8 shows a further example sample holder 10 and sample 30 which differs from that described above with respect to FIGS. 4-7 in that a portion of the holder member 12 at or adjacent the hinge 24 is permitted to separate from the base member 12 when the sample 30 is inserted into the tab 22 (i.e. between the tab and the base member 12). For example, the portion of the holder member 12 at or adjacent the hinge may not be adhered to the base member. Accordingly, a central portion of the hinge may bow outwardly relative to side portions of the hinge, so that the proximal end 42 of the sample may extend laterally under the tab 22, and extend over laterally-adjacent portions of the holder body 21. For example, a central portion of the hinge 24 may bow outwardly (i.e. away from the base member) when the sample is inserted relatively forcefully into the tab 22, or when the sample 30 is relatively stiff.

Examples of the invention as described herein permit easy insertion and removal of samples within a sample holder, whilst inhibiting unintended withdrawal, for example owing to knocks or forces that may be experienced during transit.

The features of any dependent claim may be combined with the features of any of the independent claims or other dependent claims.

The invention claimed is:
1. A sample holder comprising:
a base member;
a holder member attached to the base member, the holder member having at least one flexible tab resiliently biased towards the base member;
wherein one of the base member and the tab comprises a first formation provided on a face thereof so that a sample having a corresponding second is retained by cooperation of the first and second formations when the sample is located between the tab and the base member; and
wherein the sample holder and the sample are configured to retain the sample in a retained configuration in which:
the flexible tab is resilient biased against the sample so that the sample is clamped between the tab and an adjacent portion of the holder member adjacent the tab; and
the first formation and the second formation cooperate to inhibit withdrawal of the sample from between the tab and the base member.

2. The sample holder according to claim 1, wherein the tab is configured to flex to an insertion configuration to receive the sample.

3. The sample holder according to claim 1, wherein the holder tab is configured to flex away from the base member to define a jaw opening therebetween for receiving a substantially planar portion of the sample; and
wherein the first formation is configured to:
extend into an opening in the planar portion of the sample, the opening being the second formation; or
receive a projection extending from the planar portion, the projection being the second formation of the sample;
wherein engagement of the first formation and the second formation inhibits withdrawal of the sample along a withdrawal direction within the plane of the planar portion.

4. The sample holder according to claim 1, wherein the first formation provided on one of the base member and the tab opposes and is configured to engage a third formation provided on the other of the base member and the tab in at least an empty configuration of the tab.

5. The sample holder according to claim 4, wherein the first formation is a projection and the third formation is a hole configured to receive a portion of the first formation.

6. The sample holder according to claim 1, wherein the first formation is a projection on the side of the tab facing the base member.

7. The sample holder according to claim 6, wherein the projection has a rounded or tapered profile configured so that, upon insertion of a sample under the tab, the projection rides over an end of the sample to cause the tab to flex away from the base member from an empty configuration to an insertion configuration.

8. The sample holder according to claim 1, wherein the first formation is configured to act between the tab and the base member so that the tab projects from and is inclined with respect to an adjacent portion of the holder member adjacent the tab in an empty configuration of the tab.

9. The sample holder according to claim 1, wherein the tab is resiliently biased towards the base member so that when a sample is located between the tab and the base member so that it overlays an adjacent portion of the holder member adjacent the tab, the sample is clamped between the tab and the adjacent portion to inhibit withdrawal of the sample.

10. The sample holder according to claim 1, wherein there are a plurality of flexible tabs resiliently biased towards the base member.

11. The sample book comprising a plurality of leaves, each leaf comprising a sample holder in accordance with claim 1.

12. A sample kit comprising:
 a sample holder or sample book in accordance with preceding claim 1; and
 a sample to be retained by a tab of the sample holder, the sample comprising a second formation configured to cooperate with the first formation of the tab or a corresponding portion of the base member to retain the sample therebetween.

13. The sample kit according to claim 12, wherein the first formation comprises a projection and the second formation comprises a through hole configured to receive the first formation, whereby the first formation and the second formation cooperate to inhibit withdrawal of the sample from between the tab and the base member.

14. A The sample kit according to claim 12, wherein the sample comprises a support member and a fabric swatch mounted on the support member;
 wherein the first formation is a projection on the side of the tab facing the base member;
 wherein the projection has a rounded or tapered profile configured so that, upon insertion of a sample under the tab, the projection rides over an end of the support member to cause the tab to flex away from the base member from an empty configuration to an insertion configuration; and
 wherein in the insertion configuration, an opening is defined for receiving the sample, and wherein the combined thickness of the support member and the fabric swatch is less than a corresponding dimension of the opening to prevent sliding engagement between the end of the tab and the fabric swatch upon insertion of the sample.

* * * * *